May 24, 1949. P. M. G. TOULON 2,471,253
SIGNAL DISTRIBUTING SYSTEM
Filed June 11, 1938 7 Sheets-Sheet 1

Inventor:
PIERRE MARIE GABRIEL TOULON
By Kenyon & Kenyon
Attorneys

Inventor:
PIERRE MARIE GABRIEL TOULON
By Kenyon & Kenyon
Attorneys

May 24, 1949.    P. M. G. TOULON    2,471,253
SIGNAL DISTRIBUTING SYSTEM
Filed June 11, 1938    7 Sheets-Sheet 3

Inventor:
PIERRE MARIE GABRIEL TOULON
By Kenyon & Kenyon
Attorneys

May 24, 1949. P. M. G. TOULON 2,471,253
SIGNAL DISTRIBUTING SYSTEM
Filed June 11, 1938 7 Sheets-Sheet 5
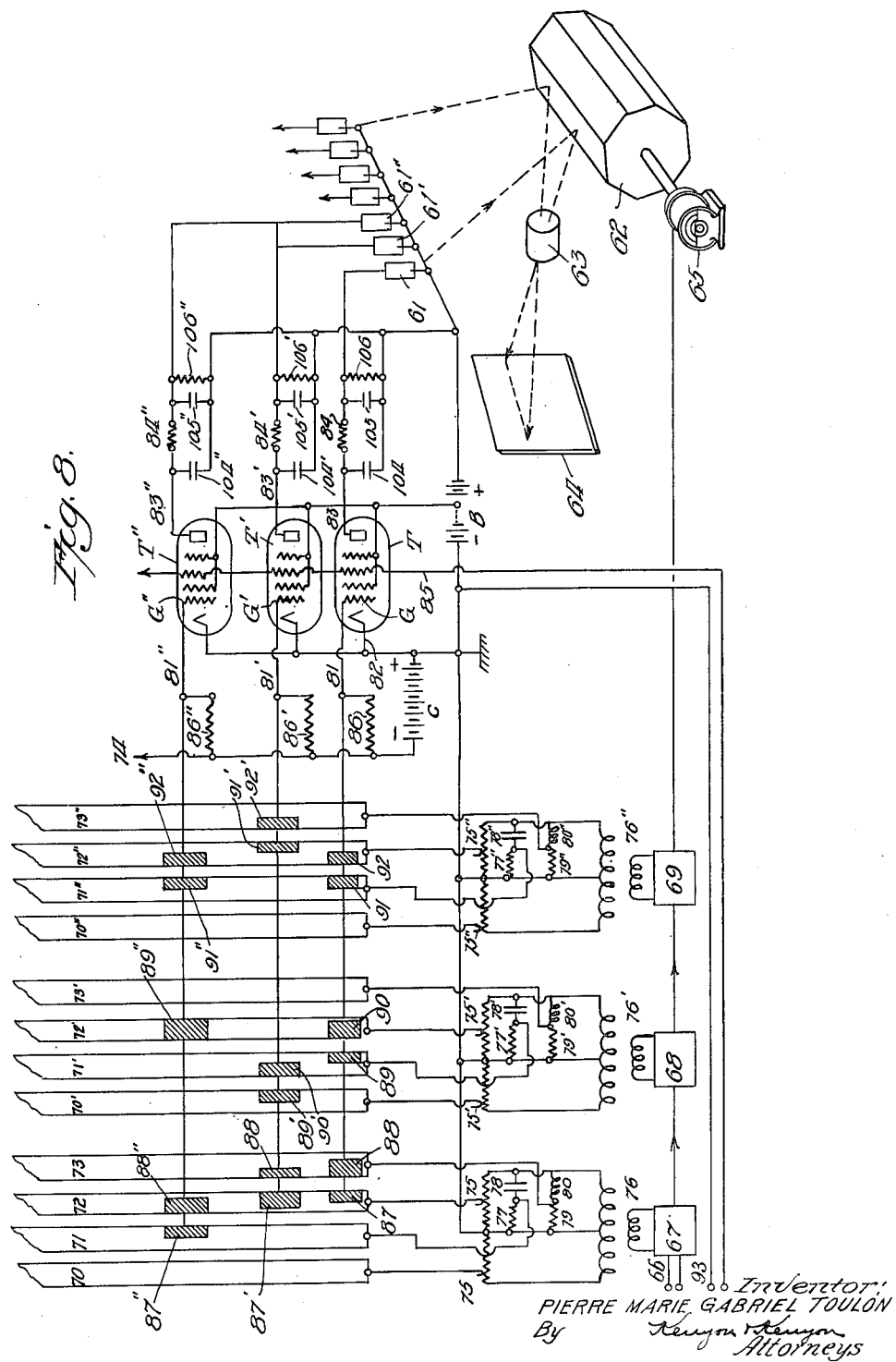

May 24, 1949.　　　　P. M. G. TOULON　　　　2,471,253
SIGNAL DISTRIBUTING SYSTEM
Filed June 11, 1938　　　　　　　　　　　　　　7 Sheets-Sheet 6
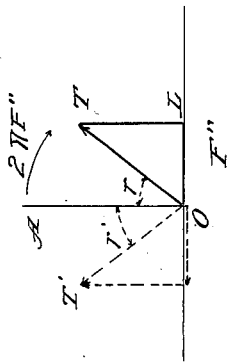
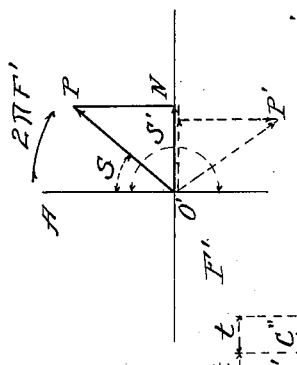
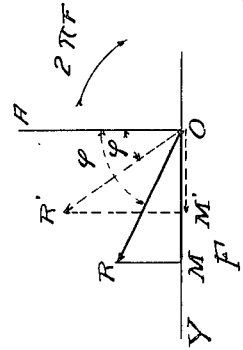
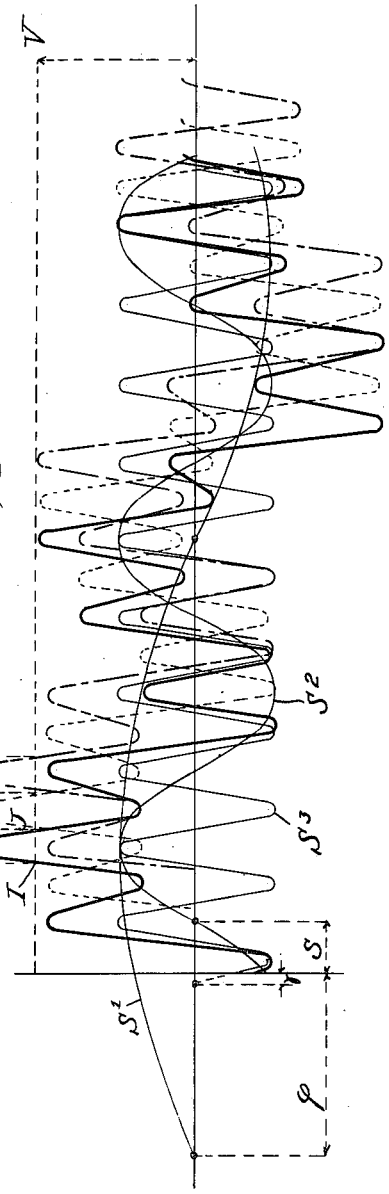
Inventor:
PIERRE MARIE GABRIEL TOULON
By Kenyon & Kenyon
Attorneys May 24, 1949.  P. M. G. TOULON  2,471,253
SIGNAL DISTRIBUTING SYSTEM
Filed June 11, 1938  7 Sheets-Sheet 7
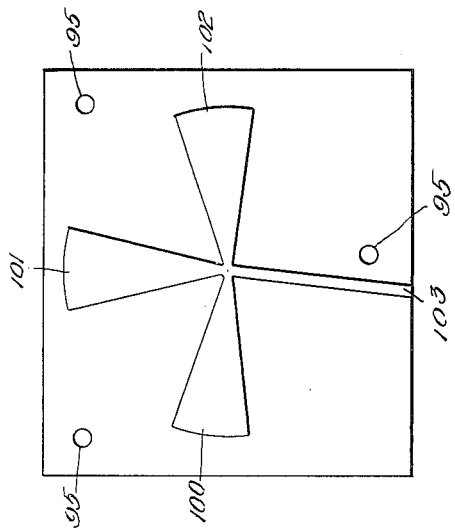
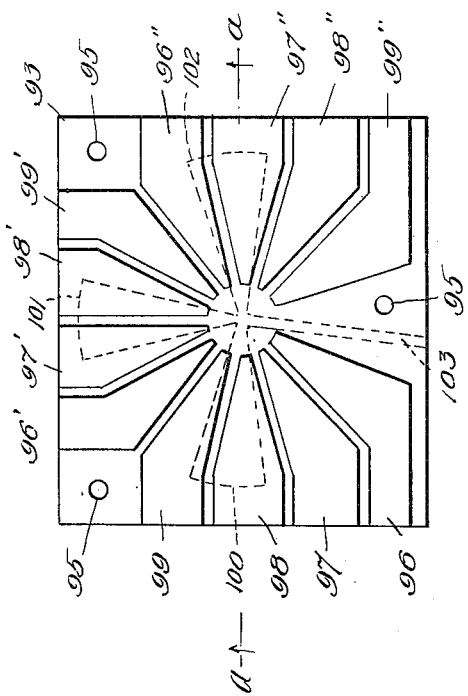
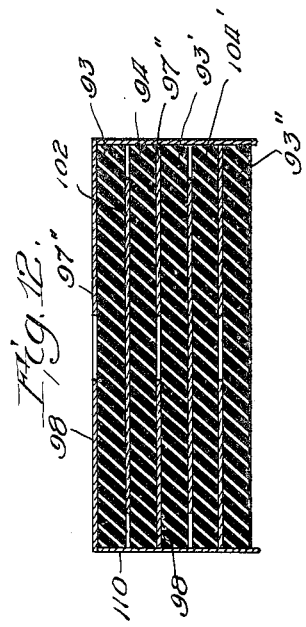
Inventor:
PIERRE MARIE GABRIEL TOULON
By Kenyon & Kenyon
Attorneys Patented May 24, 1949

2,471,253

UNITED STATES PATENT OFFICE 2,471,253

SIGNAL DISTRIBUTING SYSTEM

Pierre Marie Gabriel Toulon, Puteaux, France

Application June 11, 1938, Serial No. 213,289
In France June 15, 1937

Section 3, Public Law 690, August 8, 1946
Patent expires June 15, 1957

8 Claims. (Cl. 178—7.3)

The present invention relates to an improved method for the distribution and transmission of signals of high frequency, and more particularly to a system adapted for television. In certain television or signaling devices it may be desirable to connect the electrical or electro-optical elements to a single line which is supplied with the incoming signal, the signal actuating only those elements which at a given instant are made responsive to the signal by, for instance, blocking and unblocking the terminal connections to each element.

According to the present invention, it is possible to render such a system simple and reliable in operation, and more particularly to avoid the reaction between the incoming high-frequency signal circuits and the circuits of distribution. The line on which these circuits are placed is called an artificial line; and for the purpose of distribution it may be supplied with additional auxiliary high-frequency current or currents superimposed on the received signals. If several high-frequency currents are used, they may be so placed with respect to one another that more sharply defined current impulses are produced to facilitate the distribution. It is also possible to stabilize the circuits by the use of specially connected multi-grid tubes.

The invention will be better understood by reference to the accompanying drawings, in which:

Fig. 8 shows a modification of the circuit of Fig. 1, employing several frequencies for distribution;

Figs. 9a, 9b, and 9c are vector diagrams useful in explaining the operation of the circuit of Figure 8;

Fig. 10 is a wave form diagram explanatory of the operation of the circuit of Fig. 8; and Figures 11a and 11b and Fig. 12 show the construction of certain of the elements of the circuit of Fig. 8.

Figure 1:
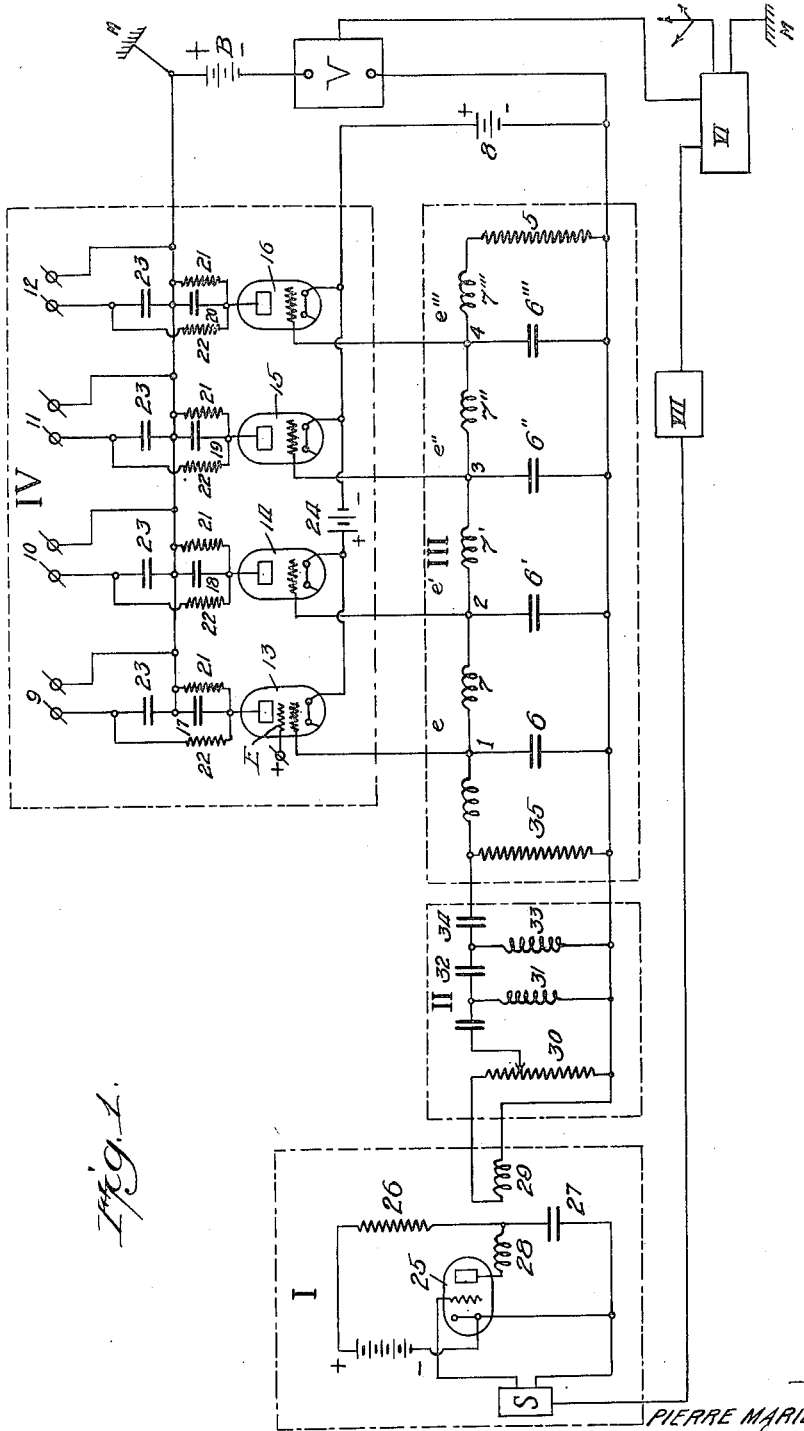
Fig. 1 shows a general circuit of an artificial line for the transmission and distribution of signals with its terminal connections.

Referring now to Figure 1, the rectangle VI schematically represents the receiving apparatus of the radio signals, which may be television signals. After amplification and detection the signals are sent to the director device V which separates, amplifies and rectifies the video impulses of the signal, which are then distributed. The distribution is accomplished by blocking and sensitizing the circuits indicated in the rectangle IV. The rectangle III shows the distributing device in which the generated sensitizing impulses are successively introduced into the line, employed for the purpose of scanning. I represents an apparatus which supplies the artificial line with impulses of short duration which propagate from the first section 6—7 of the line to successive sections 6'—7', 6"—7", and so forth, so that short impulses of a voltage $e$ appear at the section terminals 1, 2, 3 and 4. The apparatus I may be synchronized with the aid of device S, which in turn may be controlled by synchronizing signals (at the end of each line) released by the device represented by rectangle VII. Rectangle II represents the filter inserted into the artificial line to improve its action, and will be discussed later.

One of the new features of the above arrangement resides in the fact that the sensitizing impulses are applied to the control-grids of vacuum tubes 13, 14, 15 and 16 the anodes of which are supplied by a common battery B, while the video signals are applied in the anode circuits of the tubes. Normally these tubes are blocked by a negative bias voltage applied to their grids by means of a battery 8 through resistor 5 at the end of the line and through the inductors of the line to absorb the impulses. The video currents arriving from V cannot pass through these blocked tubes. The signal $e$ appearing at section terminal 1 of the artificial line is introduced into the grid circuit of vacuum tube 13, where it overcomes the negative bias and thus renders the tube sensitive. The video signal, which at that moment appears in the device V, may thus pass through the tube and charge the capacitor 17 in the anode circuit. It must be noted that this arrangement reduces the possible reaction of the video circuits upon the distributor circuits, particularly important with respect to the impulse $e$ for precise definition of scanning. The further isolation of circuits may be obtained by placing a screen-grid (not shown) between the control-grid and the anode. The anode potential of tubes 13—16 may be assured by the video impulses which have been rectified. The next moment, the impulse arrives at the terminal 2 of the line and the tube 14 is sensitized, which permits the video impulse which was present at the terminals of the director V to charge the capacitor 18. In the following moment the capacitor 19 is charged through tube 15, then capacitor 20 is charged through tube 16, and so forth. These charges slowly leak through the resistors 21, so that the duration of the charge potential is prolonged.

The terminals 9, 10, 11 and 12 may be connected to receiving elements. These elements may be of electro-optical nature for transforming electrical impulses into light, and may be of the static, movable, changing refraction index, diffusion or transparency type, or of any other type responsive to electric current. Instead of connecting to such electro-optical elements, the terminals 9—12 may be connected to secondary commutators. Thus, for instance, terminals 9—12 may represent electro-optical elements of a line equal in number to the number of points of a picture-line, and this line may be further projected on the screen with the aid of vertical scanning to form an image. It is also possible to form a horizontal line of a multiple screen having as many elements as there are points in the entire image, a number of such lines being placed in parallel to form a screen upon which the reproduced image is directly observed. In this later case the terminals 9—12 are connected to vertical distribution lines to which are connected one after another the horizontal lines; this second connection is made by means of a low-speed commutator.

Fig. 1 shows that the terminals of utilization 9—12 are not directly connected to capacitors 17, 18, 19 and 20, but through a time-delay network comprising, in the case of terminals 9 for example, resistor 22 and capacitor 23. This arrangement has for its purpose a more progressive building up and decaying of the potential of video signal at the terminals of utilization, which results in an improvement in the action of the electro-optical elements. It is evident that, by placing resistor 21 across capacitor 17, while retaining capacitor 23 as shown, a potential divider may be realized. The common return of these storage circuits, which retain for a while a charge and prolong the action of discharge, is at the chassis in M.

The battery 24 supplements the grid-bias voltage which is supplied to tubes 13 and 14 by battery 8, and thus tends to compensate for the fact that the amplitude peaks of voltage $e$ are higher at terminals 1 and 2 than in subsequent filter sections, by correspondingly decreasing the amplification of tubes 13 and 14.

Generator I, having a thyratron 25, is released by the device VII, which supplies the excitation to the artificial line. Its discharge is controlled by the synchronizing signals. The thyratron 25 rapidly discharges the capacitor 27 which is charged by the battery in series with resistor 26. The discharge passing through primary winding 28 of a transformer induces sudden impulses in the secondary winding 29. The potentiometer 30 serves to adjust the amplitude as well as to damp the line. The impulses may then be sent through a high-pass filter 31—34, which improves their wave form by making them of still shorter duration. Finally, they appear at the resistor 35 of the line. The adjustment of the potentiometer 30 and of the potential of battery 24, and the use of the high-pass filter 31—34, insures satisfactory action of the artificial line, even if the peaks of signal $e$ appearing at different sections of the line vary within certain limits.

Figure 2:
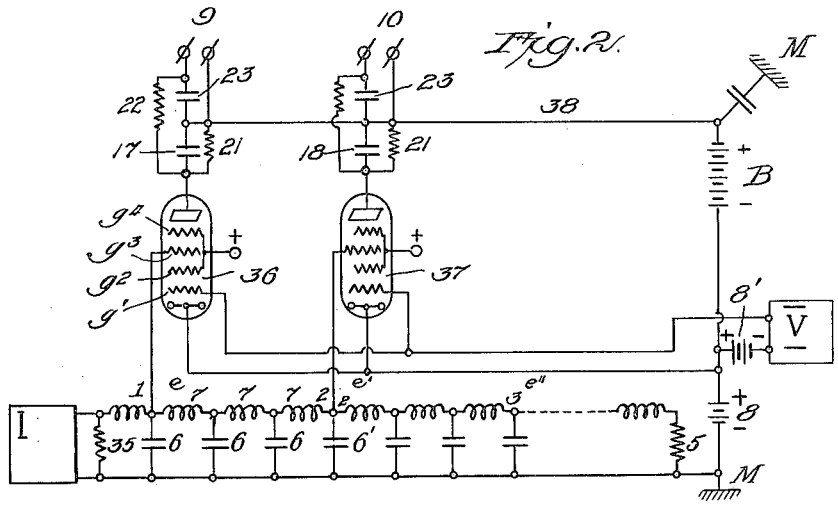
Fig. 2 shows an arrangement for the separation of individual circuits by means of multi-grid tubes.

Fig. 2 shows a modification of the circuit of Fig. 1, the same or similar devices being designated by the same reference numerals. The important difference between the circuits of Figs. 1 and 2 resides in the use of multi-grid tubes for blocking and unblocking the lines, and in the application of video signals and scanning impulses to two different grids. The impulses $e$ produced in the artificial line are successively delivered to grids $g_3$ of tubes 36 and 37; and the video signals arriving from V, instead of being applied to the anode circuits of the tubes as in Fig. 1, are applied to control-grids $g_1$ which are negatively biased by battery 8'. The grids $g_2$ and $g_4$ are the usual screen-grids connected to a source of positive potential. In certain cases the action of the grids may be reversed by using $g_1$ for blocking and $g_3$ for video currents. The action is again prolonged by storage capacitors 17 and 18. The described circuit allows more efficient separation of sensitizing and video signals; also, it permits the grounding of the artificial line, thus insuring stability of high-frequency potentials and limiting the fluctuations of potential in director V. Another advantage of this circuit is that the energy consumption in the video circuits is reduced to a minimum, since the video impulses are applied to negatively biased grids. Further improvement in the action results when the inductors and capacitors of each section are re-arranged as shown in Fig. 2 by dividing inductors and capacitors in fractions.

Figure 3:
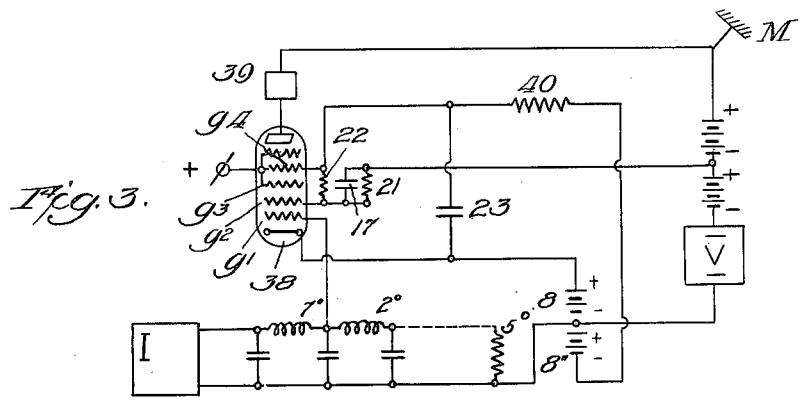
Fig. 3 shows a modification of Fig. 2, where additional amplification is desired.

The potentials stored at the terminals 9 and 10 as derived from video signals may not be sufficient to actuate the electro-optical elements. In such a case, additional amplification may be required, which can be easily obtained without additional tubes, by using pentagrid-type tubes. Such an arrangement is shown in Fig. 3, where the grid $g_1$ of tube 38 receives the sensitizing peaks, the grid circuit being normally blocked by battery 8. The video signals are applied to grid $g_2$ and are stored by capacitor 17 and discharged through resistor 21. The potential appearing across capacitor 23 is applied to grid $g_4$. In this case, the amplified voltage controls electro-optical elements 39 placed in the anode circuit, battery 8'' and resistor 40 reducing the polarization of grid $g_4$, while a virtual cathode is established between the blocking and amplifying electrodes.

Figure 4:
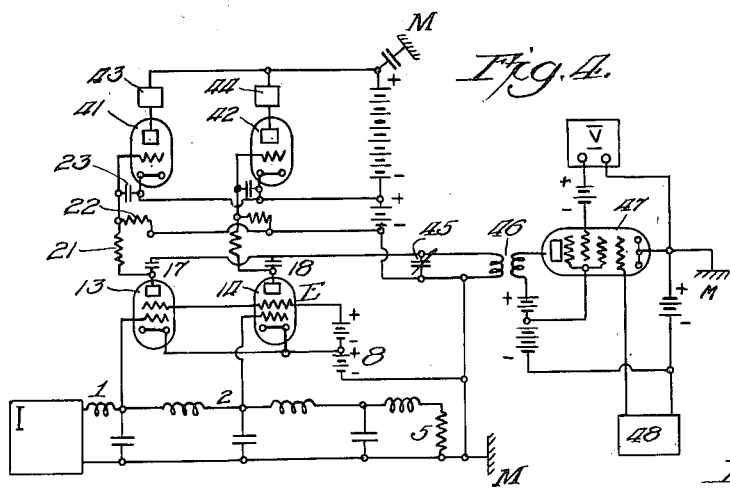
Fig. 4 shows a circuit employing an auxiliary high-frequency circuit.

In order to stabilize the potential of the distributor by grounding and to isolate director V, it is desirable to introduce into the distributing circuits a very high carrier frequency which is modulated by the video currents. This arrangement also facilitates the parallel distribution of the video currents to the blocking tubes, as the inter-electrode capacitances of, and the capacitances between, the tubes are then greatly reduced. Fig. 4 shows an example of such an arrangement.

Local oscillator 48 supplies a constant frequency of much higher order than the frequency of the video signals. This oscillator supplies the first grid of hexode 47, while the second grid receives video signals from director V. As a result, the anode circuit produces the oscillator frequency modulated by the video signals. By means of a transformer 46 and storage capacitors 17 and 18, this frequency is applied to the anodes of screen-grid tubes 13 and 14. These tubes work in the same manner as in Fig. 1 and, in addition, rectify the oscillations by passing only the positive alternations. The capacitor 23 and resistors 21 and 22 not only produce the desired time delay, but act as decoupling filters. The tubes 41 and 42 amplify the video signals and deliver them to output devices such as electro-optical elements 43 and 44. Adjustable capacitor 45 tunes the secondary winding of transformer 46. In this arrangement, the distributor and the blocking circuits may be grounded. The anode-cathode capacitances of tubes 13 and 14, being now placed in shunt with the video circuits, do not enter into consideration since the total impedance is greatly reduced.

Generally, as many blocking tubes are employed as there are points in a horizontal line of the television image, but it may be advantageous to make the signal pass through the line several times in succession, in order to reduce the number of tubes. Thus it is possible to create impulses which succeed each other very regularly in the artificial line, every new impulse taking place at the precise moment when the preceding impulse reaches the end of the line. This may be realized, for instance, by connecting the output terminals of the line to the input terminals through an amplifying tube. This requires that the peak synchronizing signal arriving at the end of the line act on the grid of that tube and that its anode circuit react on the input circuit of the line. In order to obtain peaks of the very small duration which is especially desirable for propagation in the artificial line, a synchronous multivibrator or an electronic multi-grid tube in which several grids are tightly coupled may be used in place of the thyratron 25 of Fig. 1.

Figure 5:
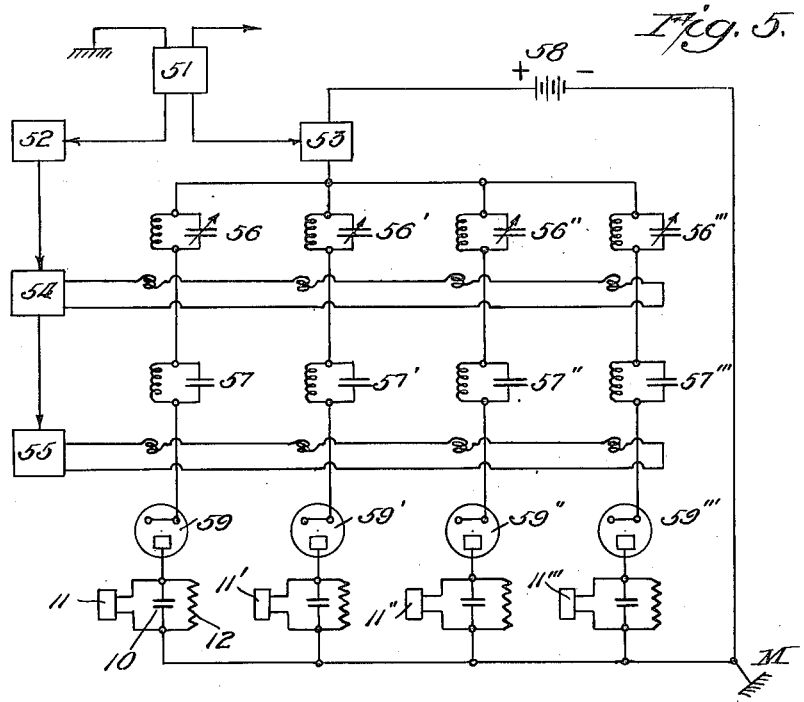
Fig. 5 shows an arrangement of the circuits in which the distribution is obtained in accordance with Fig. 4.
Figure 6:
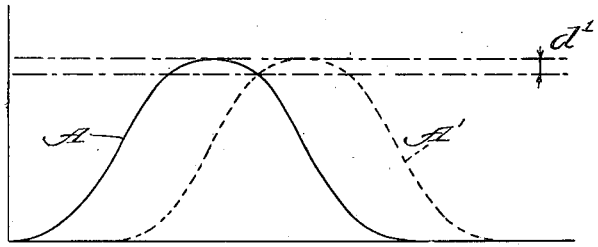
Figures 6, 6a and 6b show wave forms of the operation of the circuits of Figs. 1-5.
Figure 6A:
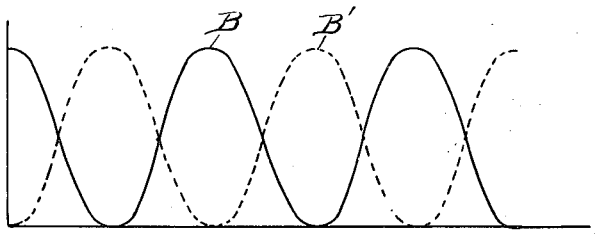

Fig. 5 shows another method of distribution based on the superimposition of several sinusoidal currents, preferably harmonics of each other, which produces sharply defined peaks more distinctly separated one from another. An oscillator 54 produces a current of frequency F, this generator being synchronized by the signals coming from the receiver 51 by means of synchronizing-signal selection device 52. The generator 54 is inductively coupled with resonant circuits 56, 56', 56'', and 56'''. There are as many of these resonant circuits as there are lines in the arrangement, which it is desirable to block or unblock. The circuits are so arranged that the potentials delivered to them are equal in amplitude but of different phase, this being accomplished by tuning the resonant circuits slightly above or below the frequency F. One alteration of a sinusoidal potential is represented by solid line A of Fig. 6a. The potential in the circuit 56' is shown by dotted line A'. The number of such curves A' and their phase relations depend on the number of points of scanning. Second oscillator 55 is connected in cascade with the first oscillator 54 and it produces a current the frequency of which is a multiple of the first frequency, for example twice the frequency F, and this current induces voltages in the resonant circuits 57, 57' and 57'' which are equal in amplitude but different in phase.

Figure 6B:
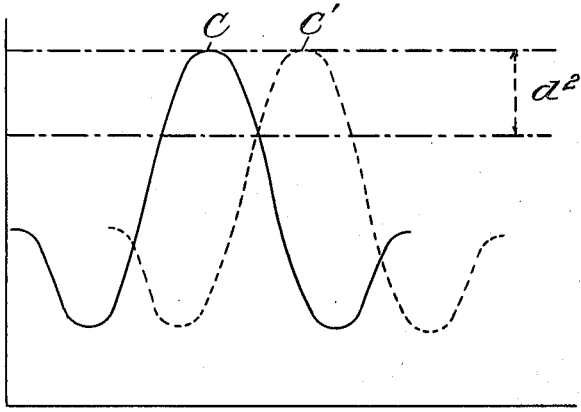

Fig. 6b represents by solid-line curve B the potential of the frequency 2F in resonant circuit 57, while the dotted-line curve B' represents the same in resonant circuit 57'. The potentials A and B introduced in the same line are superimposed so that the resultant potential is shown by solid-line curve C of Fig. 6c. Likewise, the curve C' results from the superimposition of potentials A' and B'. In this way the impulses, at a given instant, differ in amplitude by $d_2$ (Fig. 6c) which is considerably greater than $d_1$ (Fig. 6a) obtainable without superimposition. In practice, there are as many curves C as there are circuits 56. In Fig. 5, video signals released by device 53 are applied in parallel to four circuits blocked by tubes 59, 59', 59'' and 59''' on account of polarizing battery 58. At a given instant potential impulse C (Fig. 6c) neutralizes the action of the battery for a very short time, during which the line of tube 59 receives the video signal, and this signal charges capacitor 10, which will then be slowly discharged through resistor 12. The potential accumulated by this capacitor modulates the electro-optical element 11. A moment later potential C' sensitizes the line of tube 59', and so forth. These scanning potentials define precisely the moments in which these lines are sensitized. It will be understood that, instead of direct action on the blocking tubes, it is possible in accordance with previous figures to employ multi-grid tubes and to apply the impulses directly to one of the grids of the tube.

Figure 7:
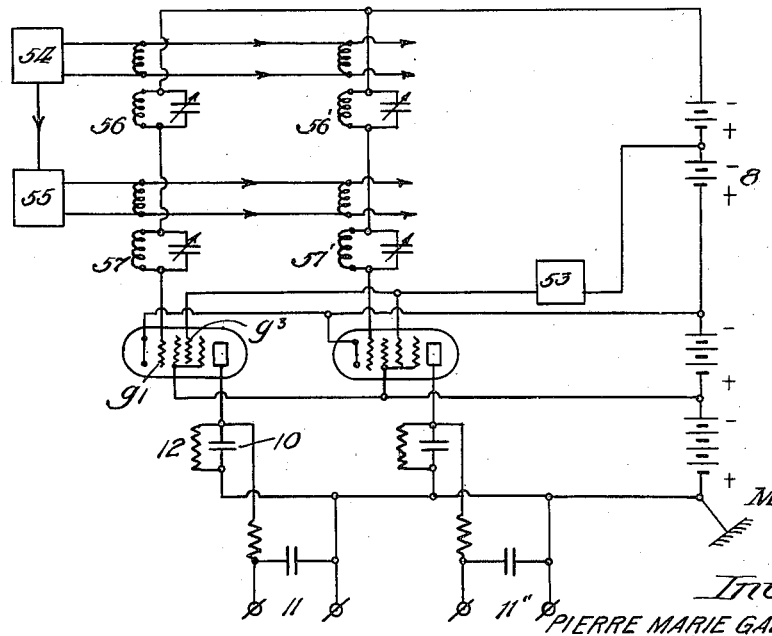
Fig. 7 shows a modification of the sensitizing circuits.

Referring to Fig. 7, it is particularly desirable to connect the line including resonant circuits 56 and 57 (Fig. 5) to the first grid $g_1$ of a hexode-type tube and to connect the common source of video signals to the third grid $g_3$, properly screened and also negatively biased. The anode circuit will comprise storage capacitor 10 and resistor 12. The reaction between the video and distribution circuits is greatly reduced, as well as the energy consumption in the circuit. The other elements of Fig. 7 are identical with the same elements of Fig. 5.

The arrangements described in Figs. 5 and 7 may be further improved by employing an additional current of harmonic frequency, for example 3F, while again the phasing and the amplitudes of the induced voltages are determined by proper choice of the capacitors. If, further, polyphase distribution is employed, the determination of the phase relations at the same frequency may be accomplished by means of two capacitors of proper value connected to different phases of the distribution. It must then be arranged that the sectors forming the out-of-phase potentials are, for the same frequency, equal in amplitude. It is also convenient to employ equal amplitudes for the different frequencies of distribution.

This arrangement, adaptable for television scanning and for multi-channel telephone and telegraph systems, is represented in Fig. 8. A row of electro-optical elements is shown by numerals 61—61'', the elements as before furnishing a quantity of light, or a degree of refraction, which is proportional to the electrical signal received. In addition, a polygon of rotating mirrors, 62, directs the light towards a lens 63. The screen is shown by 64, and 65 represents a synchronous motor for rotating the mirrors, which is synchronized with the received signals to scan the screen in the well-known manner. Line 66 receives synchronous signals, which maintain oscillator 67 in step with the horizontal line synchronization. This frequency may be designated by F. A second oscillator 68 furnishes the frequency F', a multiple of F, and also synchronized. Another oscillator 69 furnishes the frequency F'', a multiple of both F and F', and likewise synchronized. The terminals 70, 71, 72 and 73 provide tetraphase distribution at the frequency F furnished by heterodyne oscillator 67.

The neutral point of the distribution system is effectively grounded through a capacitor by wire 74. The terminals 70', 71', 72' and 73' provide tetraphase distribution at the frequency F', and terminals 70", 71", 72" and 73" at the frequency F", the neutral points again being effectively grounded.

The potentials at terminals 70 and 72 are opposite in phase, and are obtained by means of a potentiometer 75 connected to the transformer 76 coupled to the circuit of the oscillator 67. If it is assumed that the potential at terminal 72 is in phase with the heterodyne voltage, then the potential at terminal 70 is of opposite phase. The potential of terminal 71 is in quadrature and leading with respect to the output of heterodyne oscillator 67. It is obtained at the junction of resistor 77 and capacitor 78 in series across a section of transformer 76. The potential at terminal 73 is in quadrature and lagging. It is obtained from the junction of resistor 79 and inductor 80 in series across the same section of the transformer 76. The circuit elements corresponding to distribution at frequency F' are designated as 75', 76', 77', 78', 79' and 80', and the currents are applied to terminals 70', 71', 72' and 73'. Likewise, the circuit elements corresponding to frequency F" are 75", 76", 77", 78" and 80", and are applied to terminals 70", 71", 72" and 73".

T, T' and T" are double-grid hexode tubes, their first grids being shown as G, G' and G". They are connected respectively to conductors 81, 81' and 81".

The second grids are screened and are connected to line 85. This line is supplied with video signals by distribution device 93.

The anodes of tubes T, T' and T" are shown by 83, 83' and 83", and are connected to the positive terminal of battery B through two serially joined resistors 84 and 106. Every electro-optical element 61 is connected to the corresponding resistor 106. Capacitor 104 is connected between the anode of each tube and the positive terminal of battery B. Another capacitor 105 is placed between the junction of resistors 84 and 106 and the positive terminal of battery B. Resistors 84 and 106 and capacitors 104 and 105 serve to prolong the action of the anode current on the electro-optical element. Conductor 81 joins plates 87, 88, 89, 90, 91 and 92. Conductor 81' joins plates 87', 88', 89', 90', 91' and 92'. Plate 87 forms a certain capacitance with terminal strip 72. Plate 88 likewise forms a capacitance with terminal strip 73. As the terminal strips 72 and 73 are supplied with frequency F, the conductor 81 receives a potential of the same frequency. Fig. 9a represents the vectorial diagram of corresponding potentials. The ones in phase with the heterodyne oscillator output are in the direction OA, the vectors revolving in the direction of the arrow; OM represents in magnitude and phase the potential derived from strip 73 and MR the potential from strip 72; and OR represents the resultant potential at frequency F. The phase angle with respect to the output of heterodyne oscillator 67 is $\phi$. The vector OR represents the potential as a function of time and revolves with a velocity of $2\pi F$. The plate 89 forms a certain capacitance with strip 71'. The plate 90 forms a certain capacitance with strip 72'. The strips 71' and 72' being supplied with a potential of frequency F', the conductor 81 has potentials of frequency F'. Fig. 9b diagrammatically represents the corresponding potentials; ON is the one derived from strip 71', NP from strip 72', and OP is the resultant potential at frequency F'. The phase angle with respect to the output of heterodyne oscillator 68 is $\delta$ and the vector rotates with a velocity of $2\pi F'$. Finally the plate 91 forms a capacitance with strip 71" and the plate 92 with band 72". These strips being supplied with a potential of frequency F", they transmit it to the conductor 81. Fig. 9c diagrammatically represents the corresponding vectors: OL is the potential derived by strip 71", LT the potential from strip 72", and OT the resultant potential supplied to the line 81 at frequency F". The phase angle of this potential with respect to the output of the heterodyne oscillator 69 is $\gamma$ and the vector rotates with a velocity of $2\pi F"$. All the plates 87, 88, 89, 90, 91 and 92 are connected between themselves and the grid G receives the potentials OR, OP and OT at three frequencies F, F', F", these potentials adding at any instant. The curve C of Fig. 10 shows the amplitudes of the potential applied to the grid G of Fig. 8, as a function of time. It is the sum of three sinusoids, $S_1$, $S_2$, $S_3$, corresponding to vectors OR, OP, OT at frequencies which are multiples of each other and with phase angles respectively $\phi$, $\delta$, $\gamma$ with respect to their origins. It is arranged that the maxima of the three sinusoids coincide so that the curve C represents the maximum points greatly accentuated at a given instant of the period.

Quite similarly the conductor 81' is connected to plates 87' and 88', supplied with a potential of frequency F; to plates 89' and 90' supplied with a potential of frequency F', and plates 81' and 92' supplied with a potential of frequency F".

As the plate 88' has a surface different from that of plate 88, the potential OM' transmitted to conductor 81' by this plate is different from the potential of OM, transmitted to conductor 81'. Equally, plate 87' has a surface difference compared with plate 87 and the potential transmitted through the capacitance of this plate is represented by M'R', having the same phase as MR but being of different magnitude.

By an appropriate choice of capacitors which form the part of this arrangement, the amplitude of the resultant potential OR' is chosen to be equal to the potential of OR, and it is arranged to have a phase difference of $(\phi'+\phi)$. The choice of the surface of plates 89' and 90' is such as to obtain at the frequency F' a resultant potential OP' equal to OP with a desired phase difference of $\delta'$. Finally, the choice of the surfaces of plates 91' and 92' is such as to obtain at the frequency F" the resultant potential OT' equal to OT and with a desired phase angle $\gamma$.

By the choice of phase differences the curve C', shown by dotted lines in Fig. 10, representing the sum of three potentials of frequencies F, F' and F", is applied to conductor 81'; it may have the same shape as the curve C, but with the maxima of the two curves separated by $t$. The conductor 81" is connected to plates 87", 88", 89", 90", 91" and 92", the resultant potential of frequency F" being formed by a single vector corresponding to a single capacitance due to plate 89", the other vector being reduced to zero in the absence of a second capacitance. By choosing the surfaces of the plates the potential C", shown by a mixed line in Fig. 10, may be obtained of the same shape as curve C and C' and with the same separation as in the preceding cases, that is, the curve C" being separated by $2t$ from the curve C. The same may be arranged for other conductors whose peaks of potential are separated by $3t$, $4t$, and so forth. As the period $t$ may be fixed as desired by the choice of surfaces of the plates, it may be arranged that the time *t* corresponds to the separation between two adjacent points of the scanned line of the image. For this purpose, it will be convenient to vary *t* with respect to the frequencies F, F' and F'', as well as the position and order of the plates. It is preferred to choose the vectors OR, OP and OT of different frequencies to be equal, although it is not essential.

The average potential of each conductor 81 is stabilized by means of a resistor 86 connected to a common conductor 74. The battery of polarization C allows this conductor 74 to be considerably negative with respect to ground, to which all the cathodes are connected. The absolute potential produced by the battery C is shown by dotted line V of Fig. 10. The potential curves C, C' and C'' have peak points of greater amplitude and of opposite polarity compared with the battery C, and this tends to bring the potential of grids G to positive values. Thus every value of potential during a time *t* which is between the intersections I and J will compensate for the negative polarization of grids G and the respective tubes will thus become operative.

The operation of the system of Fig. 8 is as follows:

All the grids G of the tubes T are normally negative because of the bias produced by battery C, and the tubes T are thus blocked. No current can circulate in resistors 84 and 106, so that both terminals of the electro-optical elements are at the same potential, thus rendering the elements non-operative so they appear obscured. As soon as heterodyne oscillators 67, 68 and 69 begin to oscillate synchronously with the received impulses, the grids G, G' and G'' each successively take a positive potential during a short period, so that anode current flows in the corresponding tube. Since the second grid 85 is modulated by video signals, the anode current increases when the video impulse is greater. Assume that the first tube, corresponding to the first electro-optical element, becomes positively polarized when the first impulse arrives from device 93. The anode then supplies a current to the first point of the line of the televised image which is proportional to the brightness. The other tubes remain blocked. This current charges capacitor 104, which is in circuit with the anode. This charge slowly leaks across resistors 84 and 106, the leakage being regulated by capacitor 105. The electro-optical element 61 functions as long as a potential exists on the terminals of resistor 106.

Immediately after the video impulse arrives which corresponds to the second point of the line, the grid G' of tube T' takes a positive potential determined by the duration of the peak C' and the anode current begins to flow in tube T', while tube T is again blocked. The grid 85 at this instant is controlled by the video signal so that the anode current responds accordingly. This current again is the function of brightness and causes the electro-optical element 61' to act. A very short time after, the grid G'' is brought to a positive potential and this moment corresponds with the arrival of the third video impulse, which by means of tube T'' actuates element 61''. Thus the elements 61, 61' and 61'' in line reproduce a luminous response corresponding to a line of the image. The rotating mirror 62 projects the image on the screen 64. Because of the accumulation effect, all the lines appear simultaneously on the screen. The line of elements 61, 61' and 61'' may equally well be part of a multi-element screen, in which case the vertical scanning may be eliminated.

Figs. 11 and 12 show examples of the execution of different capacitors as above described. Very thin leaves of an insulator, such as mica, may be employed, one face of which has a conducting surface made by deposit either by cathode sputtering, chemically, or by condensation of metal. Two groups of leaves, one of which is shown in Fig. 11a and the other in Fig. 11b, may be employed. The leaves of the second group interlace with the first. Fig. 11a shows a leaf on which four deposits 96, 97, 98 and 99 are applied independently, and they form the plates corresponding to bands 70, 71, 72 and 73 of Fig. 8, connected to the distribution source of frequency F'. Likewise, 96'', 97'', 98'' and 99'' represent four deposits corresponding to strips 70'', 71'', 72'' and 73'' of Fig. 8, and are connected with the distribution source of frequency F''. The section at line a—a of Fig. 11a is shown in Fig. 12. Below the leaf 93 a leaf 94 is placed, the form of which is shown in Fig. 11b. Next below is placed leaf 93' shaped identically with preceding leaf 93. The sectors 100, 101 and 102 of leaf 94 face the strips 98—99, 97'—98' and 96''—97''; the symmetrical strips being interconnected. This is shown on Fig. 12 by a conductive layer on one side and by the sectors of leaf 94 between them. Comparison of Figs. 11 and 12 with Fig. 8 shows that capacitors 72—87 of this figure are formed by strips 98 of leaves 93 and 93', and by a section of strip 100. Thus, in continuing the piling together and choosing the shape and disposition of the leaves, all the capacitors of lines 81, 81' and 81'' may be realized.

Fig. 8 shows the use of tubes of the hexode type, for the purpose of additionally amplifying the video impulses to actuate the electro-optical elements. In a case where elements of low consumption of energy such as electrometers are used, the hexodes may be replaced by simple diodes, which may be put together in groups so that the total number of tube envelopes is reduced to a small number even for a line containing 500 points per line. The choice of groups should be so arranged that the mutual action between the electrodes will be negligible.

In certain cases it is desirable to employ an auxiliary carrier wave of much higher frequency, which modulates the curves S1, S2 and S3 of Fig. 10, so that the resultant curve C becomes an envelope of this carrier. An additional oscillator, the frequency of which is very high, modulates the output of the heterodyne oscillators 67, 68 and 69 of Fig. 8. This expedient permits the reduction of the values of the capacitors for vectorial distribution, as well as of all other capacitors of the circuit.

The circuits above described apply equally well to any other than television distribution of electrical signals successively arriving at the same channel, but from different origins. It is particularly applicable to telephone or telegraph circuits, in which case the electro-optical elements will be replaced by amplifying or other relays which will distribute the signals to different outputs from a common channel.

Generally speaking, this invention covers any distributing system in which a periodic connection of a line with a desired output element is assured during brief intervals, without employing moving parts.

Although the above disclosure describes the prolongation of the action obtainable by storage effects, this can in many cases be dispensed with, as for example in signalling or when the electro-optical elements provide sufficient inertia so as to respond to a signal for a considerable length of time. Electrometers generally take some time to regain their original position. The attraction of electrodes toward semi-insulators (Johnson-Rabek effect) also possesses inertia. Electrolytic action which changes the color of the elements also takes some time to restore. This prolongation of action is very desirable in the multi-element screen working on the principle of diffusion of light, but the inertia or prolongation effect in no case should surpass the time required to scan once the entire single image.

The present method may be also applied to a distributing system, comprising a single communication channel (which may be a single carrier wave or a single wire circuit) and a plurality of supply lines connected in parallel to this channel, to transmit successively through this channel the electric signal applied simultaneously to these lines. In this case, these lines will be normally blocked and periodically and successively unblocked, as is described in the present application. Such may be the case for example in a television transmitter comprising several photoelectric cells simultaneously receiving the image of the object and translating it simultaneously into electric charges; these cells being connected by means of individual lines to a common transmitting channel, through which the produced electric image signals must be sent successively. This distributing method may also be applied to a message transmitting station comprising several electric signal-generating devices (such as a microphone or a telegraph key) actuated simultaneously and connected by a separate line to a common transmitting channel through which the message impulses must be sent successively.

Having thus described my invention, what I claim is:

1. In combination, a circuit network comprising a plurality of parallel information bearing channels, a plurality of harmonically related oscillators, means for deriving from each of said oscillators a plurality of alternating voltages in quadrature related phases and of predetermined relative amplitudes, a plurality of means each for differently attenuating said voltages and for superposing a plurality of said attenuated voltages, for producing a plurality of discrete impulses of relatively different time positions, and means in each of said channels for controlling a characteristic thereof in response to one only of said impulses.

2. In combination, a circuit network comprising a plurality of information conveying channels connected in parallel, at least three oscillators so related that their frequencies are divisible by a common integer, means for deriving from each of said oscillators a plurality of voltages of the same frequency and of different relative phases, means for combining said plurality of voltages derived from said oscillators for producing a plurality of separate impulses of relatively different time positions, and means associated with each of said channels for controlling a characteristic thereof in accordance with one only of said impulses.

3. A circuit network comprising means for receiving a transmitted signal, at least three oscillators producing harmonically related frequencies, a plurality of means for varying each by a predetermined different amount the phases of the signals derived from each of said oscillators, each of said plurality of means comprising means for combining a phase shifted signal from each of said oscillators to provide a composite signal, said phases being selected to provide composite signals having sharply defined peaks relatively separated by predetermined time intervals, a plurality of members capable of producing an observable response in response to information bearing signal, and means responsive to said composite signals for applying said information bearing signal to said plurality of members in succession.

4. A system for the reception of television signals or the like, comprising, means for receiving transmitted signals, at least three harmonically related oscillators, a phase shifting network associated with each oscillator for varying by successive and equal increments the phase of the signal produced by each oscillator to provide a plurality of equally phase separated signals of the same frequency from each of said oscillators, a plurality of means each for superposing one phase shifted signal from each of said at least three oscillators, whereby a plurality of composite signals is produced, each composite signal comprising a peak separated by predetermined time intervals from the peaks of the other composite signals, a plurality of members capable of producing an observable response, a normally open electronic relay connected with each of said indicating members, said relays each being actuable to close in response to said peaks, and means for applying said peaks selectively to said relays in order to close successively each of said relays and thereby to energize its associated member.

5. A signal distributing system, comprising, a channel for receiving a plurality of successive signals, a plurality of branch channels connected to said channel each for receiving said plurality of successive signals, means normally blocking each of said branch channels, means for periodically unblocking said branch channels in sequence, each for a short time interval, to pass successive ones of said signals via different ones of said branch channels, said means for blocking comprising a thermionic tube in each of said branch channels, said thermionic tubes having control electrodes normally biassed negatively to cut-off potential, said means for periodically unblocking comprising means for generating electrical control impulses and means for applying said electrical control impulses to said control electrodes in such sense as to drive said control electrodes to a potential adapted to enable current flow in said thermionic tubes, and a plurality of electro-optical elements one connected in each of said channels for actuation by said signals, said means for generating electrical control impulses comprising a plurality of interlocked oscillators for generating each a sinusoidal signal at a different frequency harmonically related to a predetermined frequency, means for deriving from each of said sinusoidal signals a plurality of quadrature phase displaced signals, means for deriving from said quadrature phase displaced signals intermediately phase displaced signals by selectively attenuating and combining a plurality of said quadrature phase displaced signals, and means for superposing said intermediately phase displaced signals of different frequency.

6. In combination, a plurality of discrete information conveying electrical channels, a separate device in each of said channels for determining an electrical characteristic thereof, a plurality of interlocked oscillators for providing a corresponding plurality of alternating voltages of harmonically related frequencies, means for deriving from each of said voltages four quadrature phase related voltages, a plurality of means for generating a plurality of time separated periodically recurrent impulses, each of said last mentioned means comprising devices for differently selectively and relatively attenuating each of a selected pair of said quadrature phase related voltages at each of said frequencies, means for superposing said selected voltages to generate periodic sharp impulses, and means for applying said impulses to control said devices in each of said channels in succession.

7. In combination, a plurality of discrete information conveying electrical channels, a separate device in each of said channels for alternatively blocking or rendering conductive each of said channels, a plurality of interlocked oscillators for providing a corresponding plurality of alternating voltages of harmonically related frequencies, means for deriving from each of said voltages a plurality of quadrature phase related voltages, a plurality of means for generating a plurality of time separated periodically recurrent impulses, each of said last mentioned means comprising devices for differently selectively and relatively attenuating a selected pair of each of said plurality of quadrature phase related voltages, means for superposing said selected voltages to generate periodic sharp impulses having the frequency of the lowermost of said harmonically related frequencies, and means for applying said impulses to control said device in each of said channels in succession.

8. In combination, a plurality of discrete information conveying electrical channels, a separate device in each of said channels for alternately blocking or rendering conductive each of said channels, a plurality of interlocked oscillators for providing a corresponding plurality of alternating voltages of harmonically related frequencies, said plurality comprising more than two, means for deriving from each of said voltages four quadrature related voltages, a plurality of means for generating a plurality of periodic time separated impulses at the frequency of the lowest of said harmonically related frequencies, each of said last mentioned means comprising capacitive means for deriving selected pairs of quadrature related voltages at each of said frequencies with predetermined attenuation, and means for superposing said attenuated selected pairs of quadrature related voltages, to generate periodic sharp impulses, and means for applying said last named impulses to control said device in each of said channels in succession.

PIERRE MARIE GABRIEL TOULON.

REFERENCES CITED

The following references are of record in the file of this patent:

UNITED STATES PATENTS

| Number | Name | Date |
| --- | --- | --- |
| 1,914,407 | Demarest | June 20, 1933 |
| 1,928,093 | Coyle | Sept. 26, 1933 |
| 1,979,463 | Goshaw | Nov. 6, 1934 |
| 2,007,809 | Nicolson | July 9, 1935 |
| 2,008,563 | Sarbey | July 16, 1935 |
| 2,021,743 | Nicolson | Nov. 19, 1935 |
| 2,055,309 | Ramsey | Sept. 22, 1936 |
| 2,072,528 | Nicolson | Mar. 2, 1937 |
| 2,092,442 | Colwell | Sept. 7, 1937 |
| 2,098,236 | Golay | Nov. 9, 1937 |

FOREIGN PATENTS

| Number | Country | Date |
| --- | --- | --- |
| 369,304 | Great Britain | Mar. 24, 1932 |
| 432,017 | Great Britain | July 19, 1935 |
| 470,495 | Great Britain | Aug. 16, 1937 |
| 497,367 | Great Britain | Dec. 19, 1938 |